(12) United States Patent
Araki et al.

(10) Patent No.: US 7,530,158 B2
(45) Date of Patent: May 12, 2009

(54) CPP READ SENSOR FABRICATION USING HEAT RESISTANT PHOTOMASK

(75) Inventors: Satoru Araki, San Jose, CA (US); Robert Stanley Beach, Los Gatos, CA (US); Ying Hong, Morgan Hill, CA (US); Thomas L. Leong, Morgan Hill, CA (US); Timothy J. Minvielle, San Jose, CA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 466 days.

(21) Appl. No.: 11/110,330

(22) Filed: Apr. 19, 2005

(65) Prior Publication Data

US 2006/0234483 A1    Oct. 19, 2006

(51) Int. Cl.
G11B 5/33    (2006.01)

(52) U.S. Cl. ............ 29/603.07; 29/603.12; 360/324.12; 360/324.2

(58) Field of Classification Search .............. 29/603.07, 29/603.12, 603.13, 603.14, 60.15, 603.16; 360/324.2, 324.12

See application file for complete search history.

(56) References Cited

U.S. PATENT DOCUMENTS

| | | | |
|---|---|---|---|
| 5,650,958 A | 7/1997 | Gallagher et al. | |
| 5,949,707 A | 9/1999 | Pohm et al. | |
| 6,392,922 B1 | 5/2002 | Liu et al. | |
| 6,445,554 B1 | 9/2002 | Dong et al. | |
| 6,624,987 B1 | 9/2003 | Hayashi et al. | |
| 6,627,932 B1 | 9/2003 | Drewes | |
| 6,669,983 B2 | 12/2003 | Kagami et al. | |
| 6,700,759 B1 | 3/2004 | Knapp et al. | |
| 6,759,081 B2 | 7/2004 | Huganen et al. | |
| 6,759,263 B2 | 7/2004 | Ying et al. | |
| 6,806,127 B2 | 10/2004 | Butcher et al. | |
| 7,120,988 B2 * | 10/2006 | Le et al. ................. | 29/603.07 |
| 2003/0035254 A1 | 2/2003 | Furukawa et al. | |
| 2003/0080088 A1 * | 5/2003 | Kagami et al. ................. | 216/41 |
| 2003/0151857 A1 * | 8/2003 | Kishi ......................... | 360/321 |

(Continued)

OTHER PUBLICATIONS

Journal of The Electrochemical Society, 148 (9) G465-G471 (2001), "Atomic Layer Deposition of A10x for Thin Film Head Gap Applications", Ajit Paranjpe et al.

*Primary Examiner*—A. Dexter Tugbang
*Assistant Examiner*—Livius R Cazan
(74) *Attorney, Agent, or Firm*—Patent Law Office of Larry Guernsey; Larry B. Guernsey

(57) ABSTRACT

A method is disclosed for fabricating a CPP read head for a magnetic disk drive having an electrical isolation layer. The method includes providing a first shield layer, depositing a sensor stack on the first shield layer, a CMP stop layer is deposited on the sensor stack, and a release layer is deposited a on the CMP stop layer. Photoresist material containing Si is deposited on the release layer, and the photoresist material is then patterned and then oxidized by Reactive Ion Etching to form a high temperature photomask. The electrical isolation layer is then deposited to surround the sensor stack using a high temperature deposition process. The read head is then continued as either an in-stack bias sensor with 'draped shield' variation, or a hard bias stabilization variation.

9 Claims, 7 Drawing Sheets

U.S. PATENT DOCUMENTS

2003/0186552 A1 10/2003 Amano et al.
2003/0235016 A1* 12/2003 Gill ........................ 360/324.12
2004/0105194 A1 6/2004 Fontana, Jr. et al.
2004/0105195 A1 6/2004 Fontana, Jr. et al.
2006/0101636 A1* 5/2006 Cyrille et al. ............ 29/603.15

* cited by examiner

CPP READ SENSOR FABRICATION USING HEAT RESISTANT PHOTOMASK

BACKGROUND OF THE INVENTION

1. Field of the Invention

The present invention relates generally to fabrication of electronic components and particularly to fabrication of components for disk drive heads.

2. Description of the Prior Art

Photomasking is a technique which is commonly used in making electronic components. It is especially useful in many patterned deposition processes in which layers are deposited one upon another, but there may be a need to block off certain areas from the deposition of one or more layers. This is commonly done by depositing photomask material, usually a photo-resist material, which hardens when exposed to certain wavelengths of light, to mask off certain areas. Unexposed areas of the photoresist material are then removed. After the deposition of the layer is done, the photomask is removed, or lifted off, taking the deposition material with it to leave an un-coated portion.

Conventional prior art photomask materials are useful for certain operations which can be accomplished within a range of lower temperatures. However, certain other operations which are becoming more widely used, must be conducted at higher temperatures, for which these prior art photomask materials are not suited.

One example which illustrates the limitations of prior art photomask materials can be found in the fabrication of disk drive heads. TMR (Tunnel Magnetoresistance) and other CPP (Current Perpendicular to the Plane) read head devices utilize a dielectric layer to confine electrical current to the sensor area. Since practical CPP devices in the deep submicron regime require self-aligned processing for patterning and isolation, the patterning techniques used must be compatible with the deposition techniques for each of the layers. Conventional photo processing materials poorly tolerate temperatures in excess of 130 degrees C. limiting applicable deposition techniques for the dielectric layer to those that are PVD (Physical Vapor Deposition)-based. PVD-based deposition techniques lack the conformality and low defect density of CVD (Chemical Vapor Deposition) techniques such as ALD (Atomic Layer Deposition). A complete review of ALD-based deposition techniques and their benefits is described by Ritala and Leskelä in Handbook of Thin Film Materials, H. S. Nalwa, Ed., Academic Press, San Diego (2001) Vol 1, Chapter 2 (ISBN 0-12-512908-4).

Thus there is a need for a photomask material which will not degrade at temperatures necessary for CVD processes. There is a further need for a method of fabrication of disk drive read heads which uses high temperature photomasks when using high temperature processes such as ALD.

SUMMARY OF THE INVENTION

A preferred embodiment of the present invention is a method for fabricating a CPP read head for a magnetic head of a hard disk drive having an electrical isolation layer. The method includes providing a first magnetic shield layer, and depositing a sensor stack on the first magnetic shield layer. Next, a CMP (Chemical Mechanical Polishing) stop layer is deposited on the sensor stack, and a release layer is deposited on the CMP stop layer. Photoresist material containing Si is deposited on the release layer, and the photoresist material is then patterned to form protected areas in the underlying materials. The photoresist material is then oxidized by use of Reactive Ion Etching (RIE) to form a high temperature photomask and to transfer the photo image into the release layer. Ion milling or RIE is then used to transfer this image into the sensor stack. The electrical isolation layer is then deposited to surround the sensor stack using a high temperature deposition process such as Chemical Vapor Deposition, where the high temperature photomask protects areas of the underlying material during the high temperature deposition process. The present invention is compatible with processes that require higher temperature than those allowed by prior art photomasks, and these processes may produce better conformality and fewer defects. These temperatures enable the use of ALD technology using TMAl (TriMethylAluminum) and Water precursors to grow $Al_2O_3$ with excellent electrical properties and step coverage. Temperatures substantially below this increase the concentration of Carbon in the film, degrading its properties. In addition, the use of low temperatures in commercially-available ALD reactors cause premature delamination of the as-grown films from the reactor walls, making the process not commercially viable.

If the sensor is an in-stack bias sensor, a draped magnetic shield material layer is deposited on the electrical isolation layer and a second CMP stop layer is deposited on the draped magnetic shield material layer. The isolation layer and the draped magnetic shield material layer are then planarized to the level of the sensor stack to form a planarized structure, upon which a second magnetic shield layer is deposited.

If the sensor is an external bias sensor, a hard bias material layer is deposited on the electrical isolation layer and a second CMP stop layer is deposited on the hard bias material layer. The isolation layer and the hard bias material layer are then planarized to the level of the sensor stack to form a planarized structure, upon which a second magnetic shield layer is deposited.

It is an advantage of the present invention that it provides a photomask material that is useful above 130 degrees C.

It is a further advantage that the present invention provides a photomask material that can be used with CVD processes.

It is a yet further advantage that the present invention provides a photomask material that can be used in the fabrication of CPP read heads having an insulation layer which is deposited by using ALD.

It is another advantage that the present invention is compatible with processes that require higher temperature than those allowed by prior art photomasks, and these processes may produce better conformality and fewer defects.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
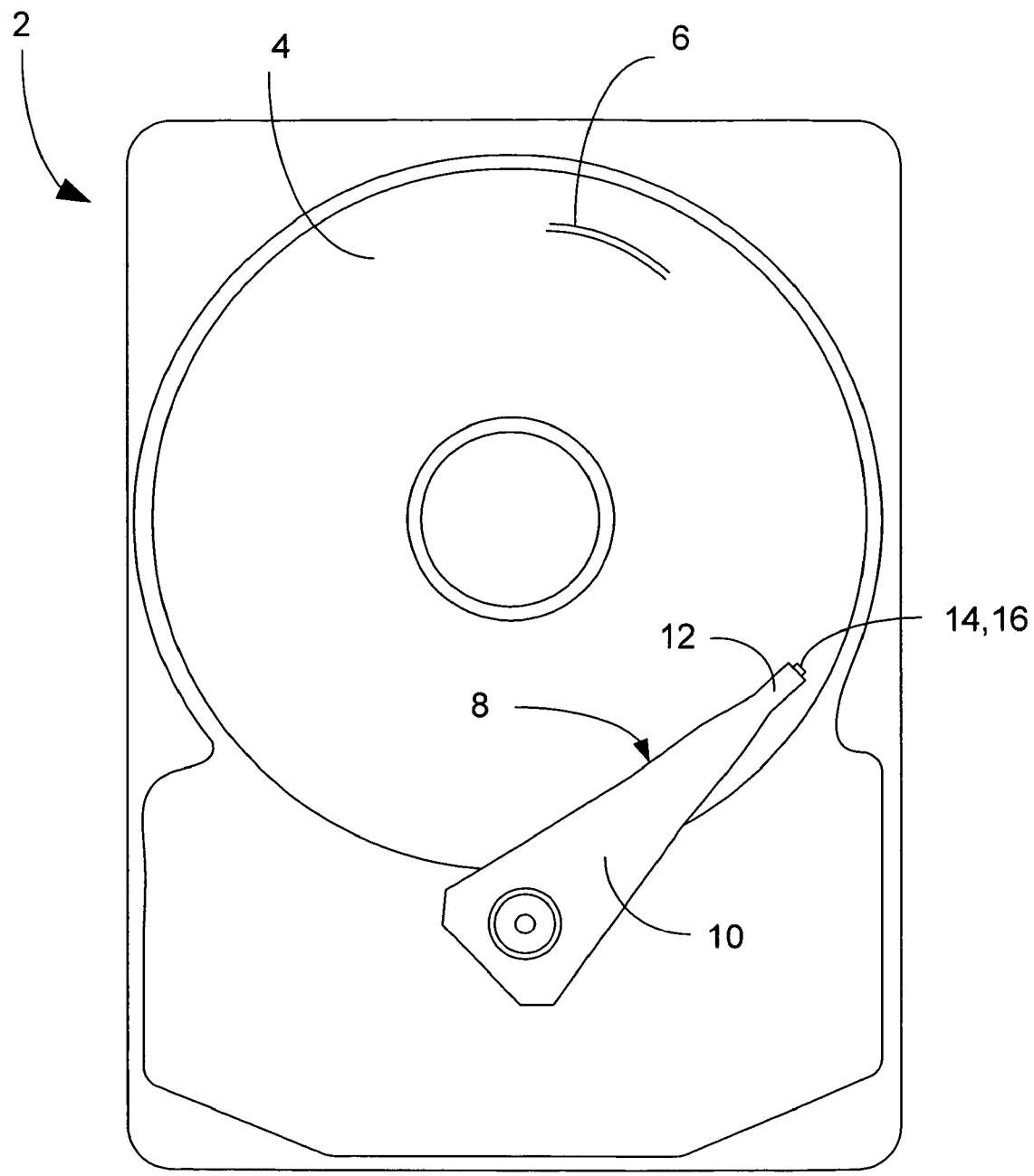
FIG. 1 shows a top plan view of an exemplary disk drive.

This invention is a photomask suitable for use with relatively high-temperature deposition processes such as ALD (Atomic Layer Deposition), and other CVD (Chemical Vapor Deposition) techniques. For purposes of this patent application, the photomask of the present invention shall be referred to as high temperature photomask, and referred to by the element number 50.

The high temperature photomask uses Si-containing photoresist which has been spin-coated and baked on to the wafer using a procedure recommended by its manufacturer. A suitable resist is called TIS 51-23il and is manufactured by ARCH Microelectronic Materials.

Following the baking step, the photoresist is then exposed using the wavelength of light which is recommended for the chosen photoresist. This exposed photoresist is then developed according to the manufacturers' recommendations to remove unexposed photoresist areas and create a robust photoresist mask.

Reactive Ion Etching is then utilized to oxidize the photoresist and to transfer the photoresist image into the underlying layers such as spin-on polymide and DLC (diamond-like carbon) layers. This step forms a hard photoresist mask layer which will later stand up to ion milling and high temperature processing. It is especially useful for the fabrication of CPP read head devices using self-aligned patterning of the sensor stack and the deposition of a dielectric current confinement layer using elevated temperature techniques such as ALD.

A CPP sensor such as a TMR (Tunnel Magnetoresistive) sensor is patterned utilizing a tri-layer structure consisting of DLC (Diamond-Like-Carbon), spin-on polymide and the Si-containing Photoresist. The Si-containing photoresist is exposed to an oxygen-containing RIE to create a significant amount of $SiO_2$. This structure is sufficiently robust to tolerate ALD deposition of Aluminum Oxide for the current confinement layer at a temperature in excess of 170 degrees C. This technique is compatible with both the ISB (In Stack Bias) and ICJ (Insulating Contiguous Junction) approaches to read head design. The ALD-synthesized confinement layer has excellent step coverage and film quality, enabling superior control and reduced thickness of the second magnetic shield to sensor (ISB) or Hard Bias to sensor (ICJ) distance. This enables stable device performance and superior shielding.

As an illustration of the use of the high temperature mask, a CPP read sensor will be discussed below, and the stages of fabrication of the CPP read sensor will be described and shown in FIGS. 5-14. It will be understood that the use of high temperature photomask material is not limited to this application, and is only one of many uses for the present invention in the field of electronic component fabrication.

As mentioned above, it is desirable for the CPP read head sensor stack to be surrounded with an electrical isolation layer, which prevents the electrical current from taking undesired paths, and causing short circuits. Since the current in this CPP design is perpendicular to the plane, it is desired to have the isolation layer surround the sides of the sensor. The preferred insulation material for this application is dielectric material such as alumina ($Al_2O_3$) or $SiO_2$, which are best deposited using high temperature processes such as ALD, and thus this is an application of the high temperature photomask 50 of the present invention.

A magnetic hard disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
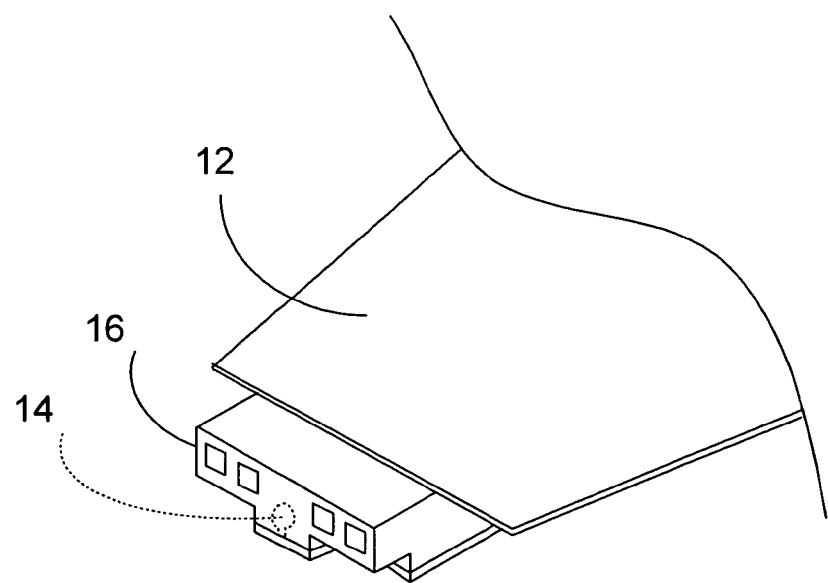
FIG. 2 illustrates a perspective view of view of an exemplary slider and suspension.
Figure 3:
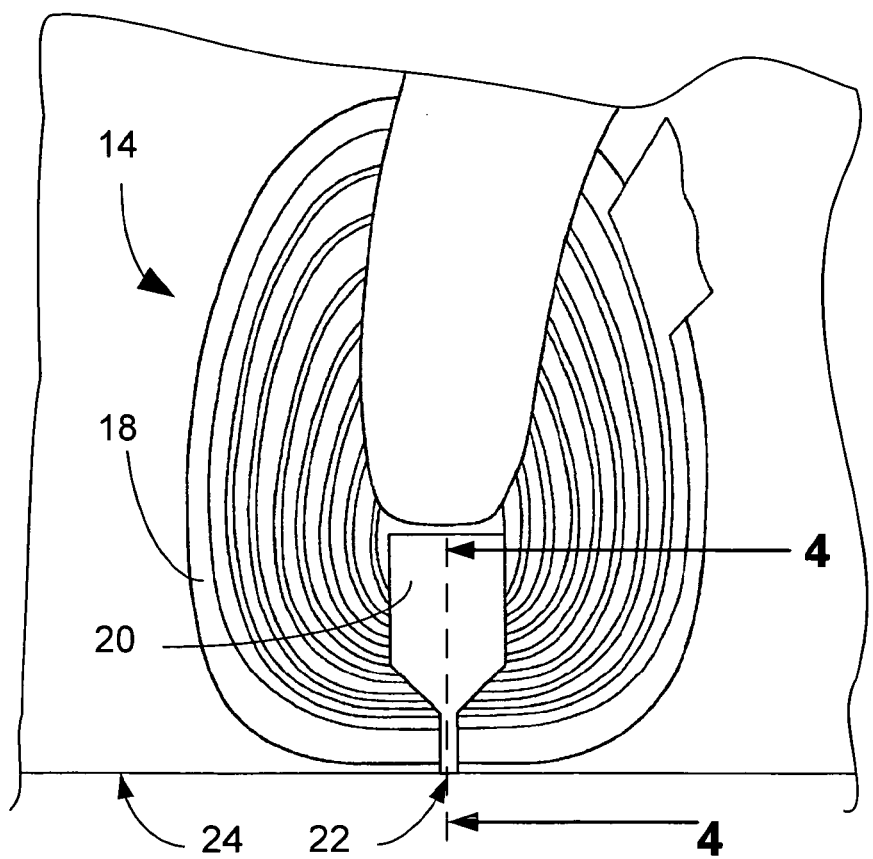
FIG. 3 shows a top plan view of an exemplary read/write head.
Figure 4:
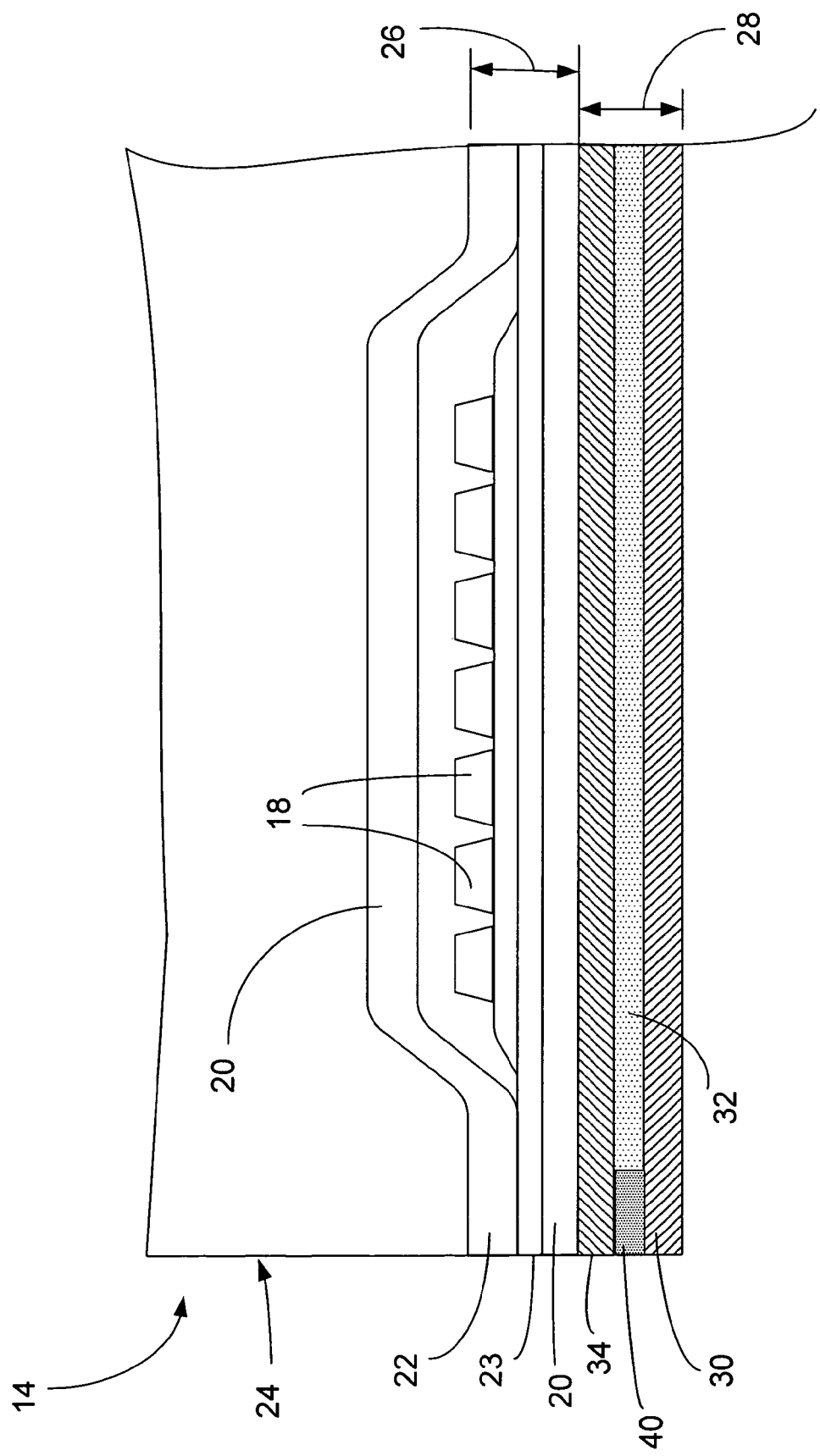
FIG. 4 is a cross-section view of an exemplary read/write head.

FIG. 2 shows a slider 16 in more detail being supported by suspension 12. The magnetic head 14 is shown in dashed lines, and in more detail in FIGS. 3 and 4. The slider shown in FIG. 4 is of a configuration known as Current Perpendicular to Plane (CPP), meaning that current flows out of the plane of the paper in FIG. 3. The magnetic head 14 includes a coil 18, P1 pole 20, and a second pole P2 22 which is separated from P1 pole 20 by write gap 23. The P1 pole 20, second pole P2 22 and write gap 23 can be considered together to be included in the write head 26.

A read sensor 40 is sandwiched between a first magnetic shield, designated as S1 30 and a second magnetic shield S2 34, and these elements together make up the read head 28. In this configuration of read head 28 where Current is Perpendicular to the Plane (CPP), shields S1 30 and S2 34 act as electrical leads supplying current to the read sensor 40 which lies between them. An insulation layer 32 also separates the S1 30 and S2 34 electrical leads in the area behind the read sensor 40, so that they do not short out along their length. The magnetic head 14 flies on an air cushion between the surface of the disk 4 and the air bearing surface (ABS) 24 of the slider 16.

Figure 5:
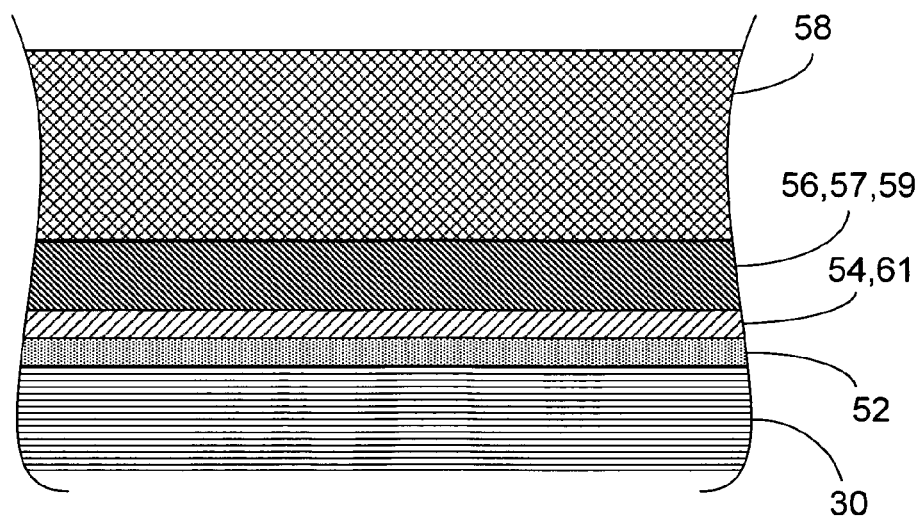
FIGS. 5-8 shows show front plan views of various stages in the fabrication of the CPP read head of the present invention.
Figure 6:
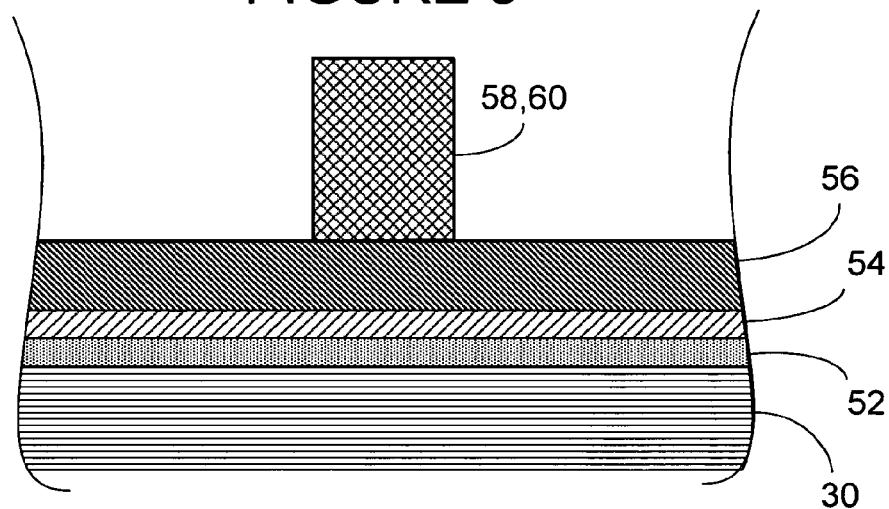

The stages in the fabrication of the read head 28 using the high temperature photomask 50 are shown in FIGS. 5-14. FIG. 5 shows the S1 layer 30 upon which sensor stack 52 is formed. It will be understood that this sensor stack 52 is preferably composed of a number of layers of material, which for simplicity of discussion, are not shown here, but generally will include a CPP-type sensor such as a Tunnel Magneto-resistance sensor or a GMR sensor. This type of sensor can be self-stabilized using an in stack bias (ISB) scheme or can be a type of sensor which requires external stabilization through the use of hard bias layers fabricated alongside the sensor stack (Insulating Contiguous Junction of ICJ). These variations will be discussed below. Next a layer of DLC (Diamond-Like-Carbon) 54 is deposited to act as a CMP stop layer 61. It can be deposited by many methods but preferably includes ion-assisted deposition from Methane and Argon. Upon the DLC layer 54 is a layer of spin-on polymide 56 such as Durimide, manufactured by Arch Micro, which has preferably been spin-coated onto the wafer. This spin-on polymide layer 56 acts as both a release layer 57 and a secondary mask 59 for subsequent ion milling.

Upon the spin-on polymide layer 56, a layer of Si-containing photoresist 58 is spin-coated and baked on to the wafer using a procedure recommended by its manufacturer. A suitable resist is called TIS 51-23 il and is manufactured by ARCH Microelectronic Materials. The Si-containing photoresist 58 is then exposed using the wavelength of light which is recommended. This Si-containing photoresist 58 is then developed according to the manufacturers recommendations, and the excess photoresist is removed to form the photomask pattern 60 shown in FIG. 6.

Figure 7:
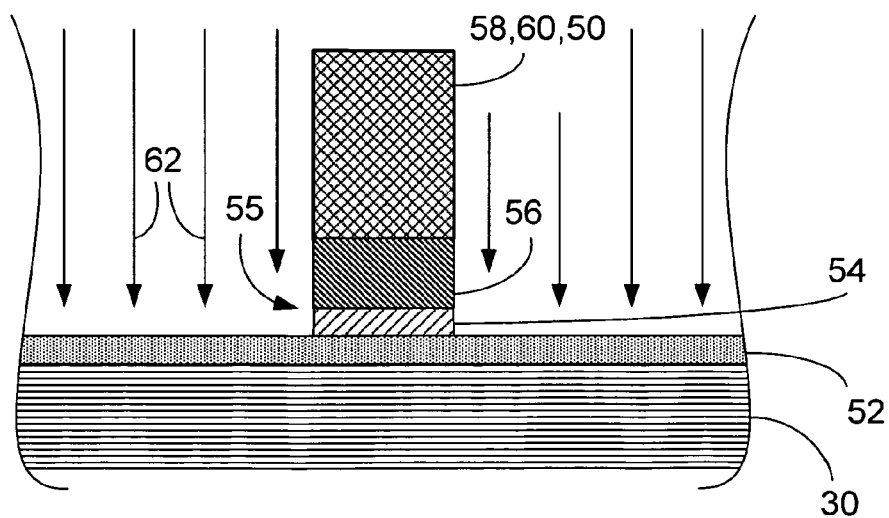

As shown in FIG. 7, Reactive Ion Etching (RIE) 62 is then utilized to oxidize the Si photoresist 58 and to transfer the photoresist image into the underlying spin-on polymide layer

56 and DLC layer 54. The RIE process uses an oxidation process and therefore uses oxidizing gases such as oxygen or $CO_2$. Since the higher the concentration of oxygen is used, the greater the oxidizing effect, the RIE process preferably uses 100% $O_2$, but adequate oxidation may be achieved at lower concentrations, so this preference is not to be construed as a limitation. This step forms a hard high temperature photomask 50 which will later stand up to ion milling and high temperature processing while forming protected areas 55 in the underlying materials.

Figure 8:
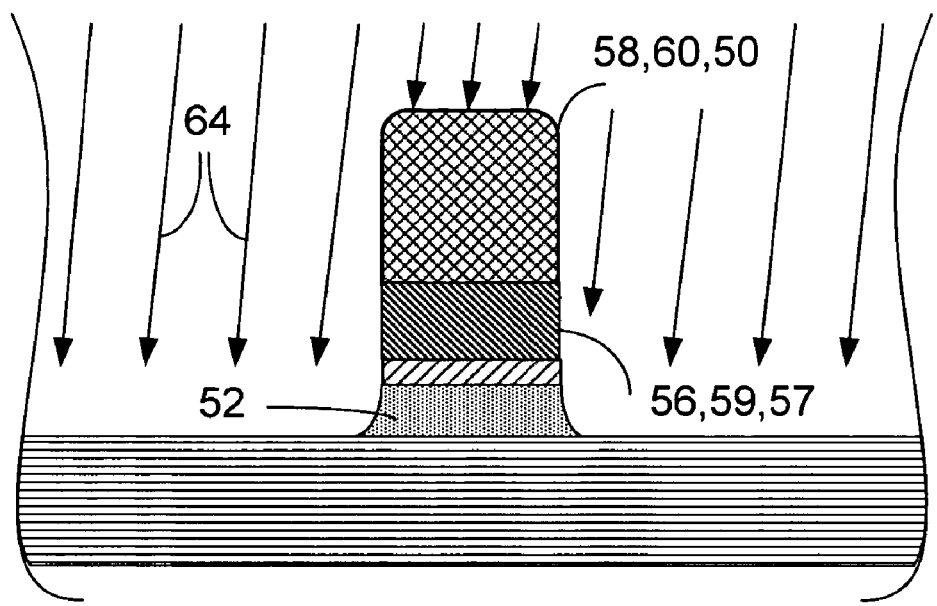

FIG. 8 shows that Ion Milling 64 then transfers the photomask pattern 58 image into the CPP sensor stack material 52. This Ion Milling 64 will preferably be carried out with inert ions such as Ar. However, it is also possible to use reactive ions or RIE here as well. Although this transfer of the photomask pattern is shown terminating at the bottom of the sensor stack 52, it may also terminate mid-way through the sensor stack 52, depending on the choice of sensor stack 52 materials and the required device performance. As shown in the figure, this step will thin, round or even completely remove the photoresist. In the case of complete removal, the spin-on polymide 56 will remain, acting as a secondary mask 59. Otherwise, the spin-on polymide 56 acts as a release layer 57.

Figure 9:
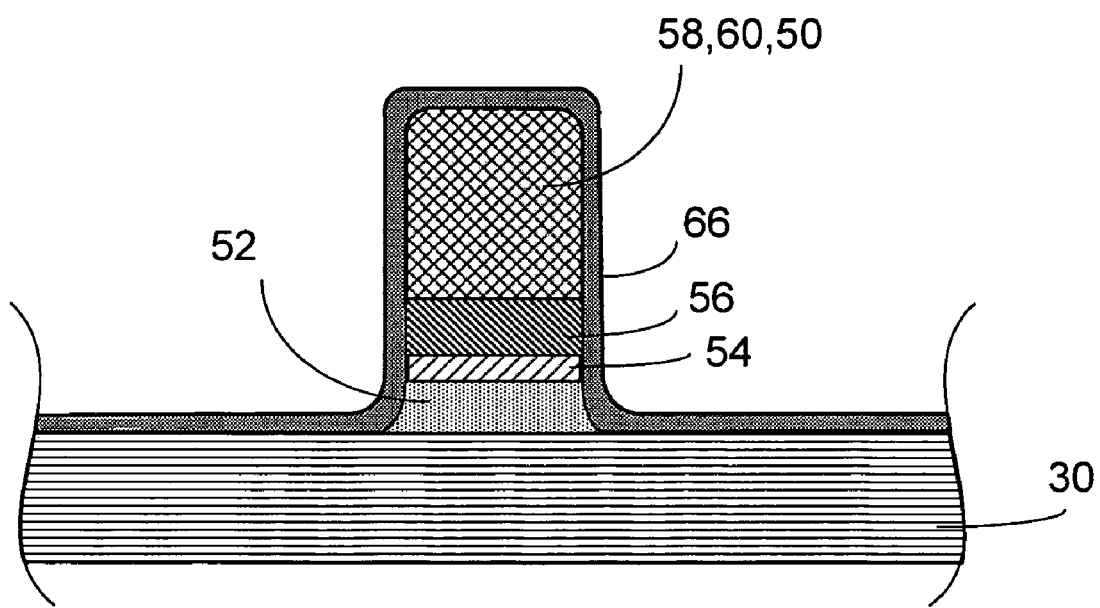
FIGS. 9-12 show front plan views of various stages in the fabrication of the "in-stack bias sensor with 'draped magnetic shield'" variation of CPP read head of the present invention.

FIG. 9 shows the formation of the electrical isolation layer 66 upon the wafer, coating the entire structure, and specifically surrounding the sensor material 52 to electrically insulate and isolate it from electrical shorts. As mentioned above, the electrical isolation layer 66 is preferably formed of dielectric material such as alumina ($Al_2O_3$) or $SiO_2$, which because of the use of the high temperature photomask material 50, can now be synthesized by high temperature methods such as CVD, ALD, Plasma Enhanced CVD or High Temperature Sputtering or any other suitable method. Since the Si-containing photoresist layer 58 is oxidized to form high temperature photomask 50 and the spin-on polymide layer 56 also has excellent temperature stability, temperature exceeding 170° C. can be used for this step. These temperatures enable the use of ALD technology using TMAl (TriMethylAluminum) and Water precursors to grow $Al_2O_3$ with excellent electrical properties and step coverage. Temperatures substantially below 170° C. approximately increase the concentration of Carbon in the film, degrading its properties. In addition, the use of low temperatures in commercially-available ALD reactors cause premature delamination of the as-grown films from the reactor walls, making the process not commercially viable. The high temperature photomask 50 of the present invention avoids these difficulties.

There are two variations possible in the following stages. The first will be referred to as the "in-stack bias sensor with 'draped magnetic shield'" 72 variation, which will be discussed with reference to FIGS. 10-12. In this variation, the sensor stack 52, which will be referred to as an in-stack bias sensor 90, includes a free magnetic layer 92 and an in-stack bias layer 94, which serves to establish a bias direction for the magnetic domains of the free magnetic layer 92, as will be familiar to those skilled in the art. The in-stack bias sensor 90 is known to include other layers, but for the sake of simplification, these layers will not be shown or discussed here. Also, it is known that variations on the positioning of the free layer 92 and in-stack bias layer 94 are possible, with the bias layer 94 being fabricated above or below the free layer 92. The free layer 92 is shown here to be above the bias layer 94, but this is not to be taken as a limitation.

Figure 10:
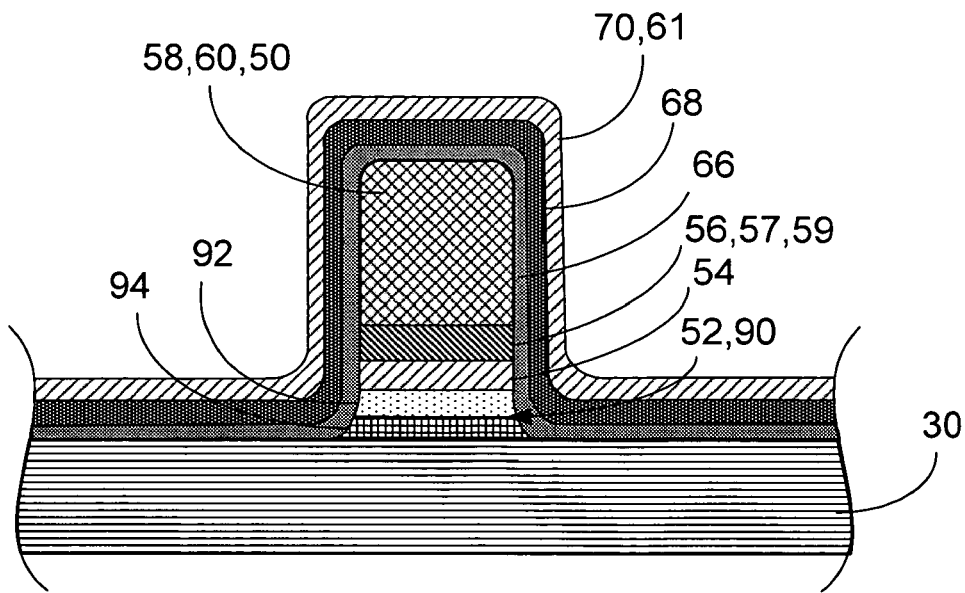

As shown in FIG. 10, when the in-stack bias sensor with 'draped magnetic shield' arrangement is used, this variation starts with the deposition of a draped magnetic shield material 68 such as NiFe (Permalloy). The preferred thickness of this shield material 68 will be that which is necessary to be planar with the height of the CPP GMR or CPP TMR sensor stack material 52. A second layer of diamond-like-carbon 70 is then deposited to act as a CMP stop layer 61. This layer has a preferred thickness less than 300 Å. It can be deposited by many methods but preferred method uses ion-assisted deposition from Methane and Argon.

Figure 11:
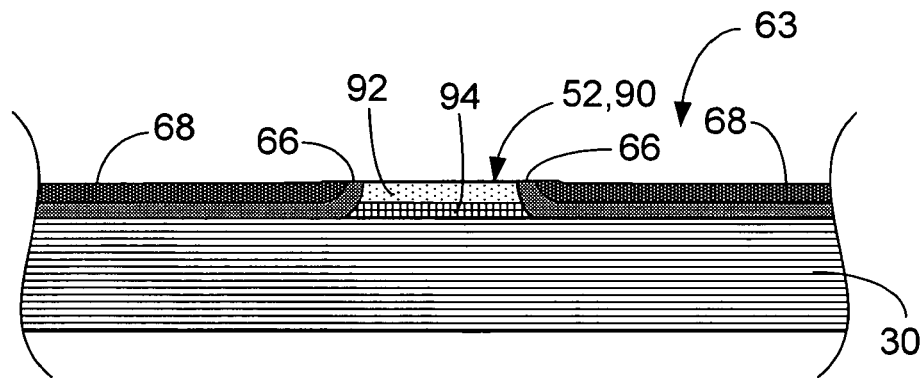

FIG. 11 shows that the photoresist 50, spin-on polymide 56 and DLC layers 54, 70 (see FIG. 10) are removed. In that removal process, a chemical strip is followed by physical removal methods such as chemical mechanical polishing (CMP), and supercritical $CO_2$ cleaning. Alternatively, the chemical strip can follow the physical removal methods, depending on the preference of the practitioner. The DLC layers 54, 70, which act as an etch or polish stop must then be stripped. RIE with oxygen or $CO_2$ readily removes this layer. This leaves portions of the electrical isolation layer 66 and the draped magnetic shield layer 68 which have been planarized to the level of the sensor stack material 52, 90 thus forming a planarized structure 63.

Figure 12:
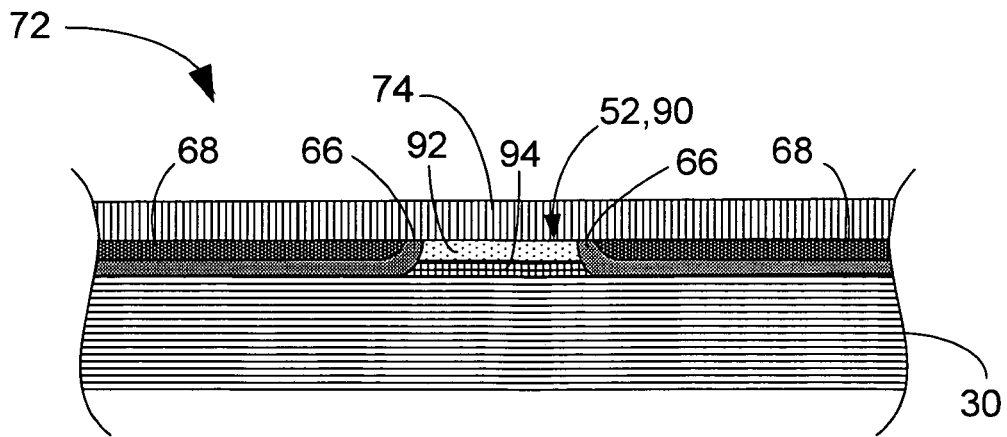

In FIG. 12, a second magnetic shield layer 74 is deposited to complete the in-stack bias sensor with 'draped magnetic shield' 72 variation. This second magnetic shield layer 74 would typically, but not necessarily, be of the same material as the draped magnetic shield layer 68, of which portions still remain, as discussed in the previous stage.

The second CPP read head variation shall be called the "hard bias stabilization variation" 76, and will be discussed with reference to FIGS. 13-15. In this variation, the sensor stack 52, which will be referred to as an external bias sensor 96 again includes a free magnetic layer 92, but an external hard bias layer 78 serves to establish a bias direction for the magnetic domains of the free magnetic layer 92, as will be familiar to those skilled in the art. The external bias sensor 96 is known to include other layers, but for the sake of simplification, will not be shown or discussed here.

Figure 13:
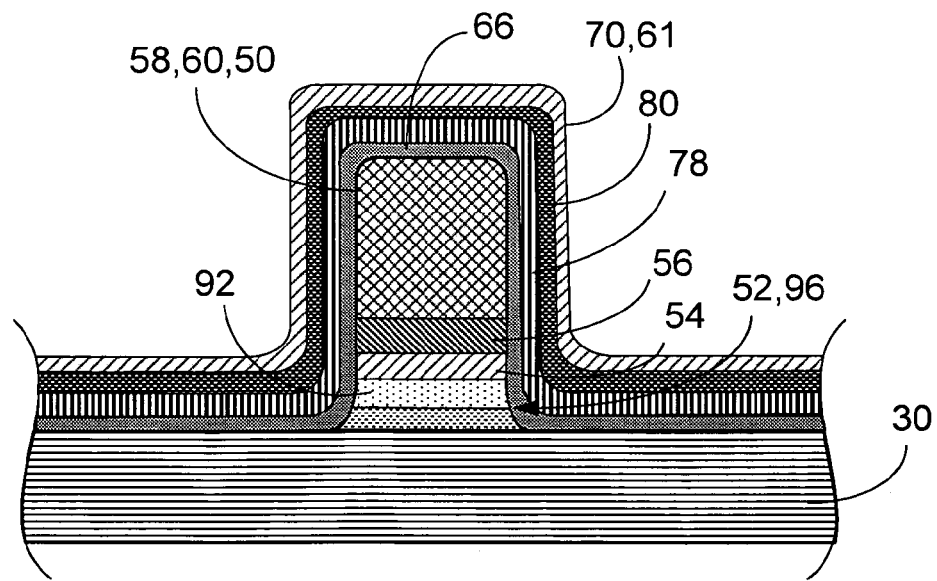
FIGS. 13-15 shows show front plan views of various stages in the fabrication of the "hard bias stabilization variation" of CPP read head of the present invention.

As seen in FIG. 13, when device design requires hard bias of the free layer 92 included in the sensor stack 96, a hard bias layer 78 such as CoPtCr is deposited. The preferred thickness of this material will be chosen as that which is necessary to stabilize the device. In the case where the thickness of the hard bias layer 78 is less than that required to planarize the structure, a spacer film layer 80 may be deposited on top of it. Such a film layer 80 can be any metal or insulator which is compatible with the many requirements for a finished recording head device—chemical compatibility, hardness, corrosion resistance, etc. One skilled in the art could readily choose many different materials. A second layer of diamond-like-carbon 70 is deposited to act as a CMP stop layer 61. This second layer of diamond-like-carbon 70 can be deposited by many methods but the preferably ion-assisted deposition from Methane and Argon is used to deposit a thickness less than 300 Å.

Figure 14:
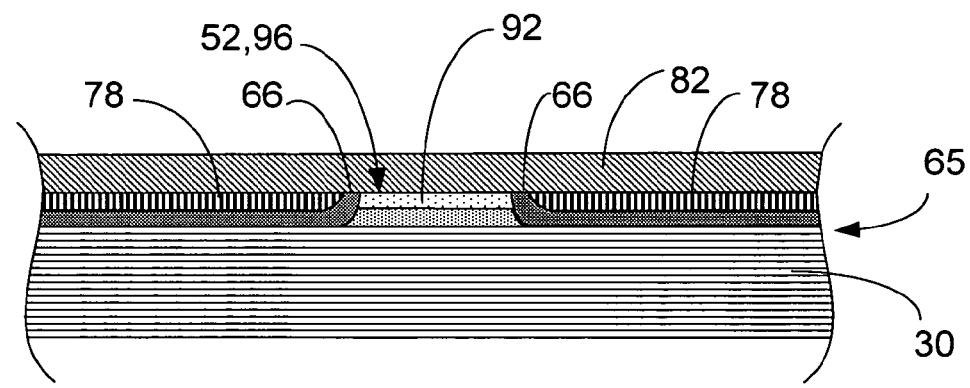

FIG. 14 shows that the photoresist 50, spin-on polymide 56 and DLC layers 54, 70 (see FIG. 13) are removed. To achieve this, a chemical strip is followed by physical removal methods such as chemical mechanical polishing (CMP), and $CO_2$ cleaning. Alternatively, the chemical strip can follow the physical removal methods, depending on the preference of the practitioner. The DLC layers 54, 70, which act as an etch or polish stop must then be stripped. RIE readily removes this layer. This leaves portions of the hard bias layer 78, optionally spacer film layer 80 (not shown) and electrical isolation layer 66 which have been planarized to the level of the sensor stack 52, 96 to form another planarized structure 65.

If device performance requires a particular read gap thickness, a combination top electrode/spacer layer 82 may be deposited here, however this step is entirely optional. In a CPP structure of any sort, this electrode/spacer layer 82 should be a metal which is compatible with the many requirements for a finished recording head device—electrical conductivity, chemical compatibility, hardness, corrosion resistance etc. Again, one skilled in the art could readily choose many different materials.

Figure 15:
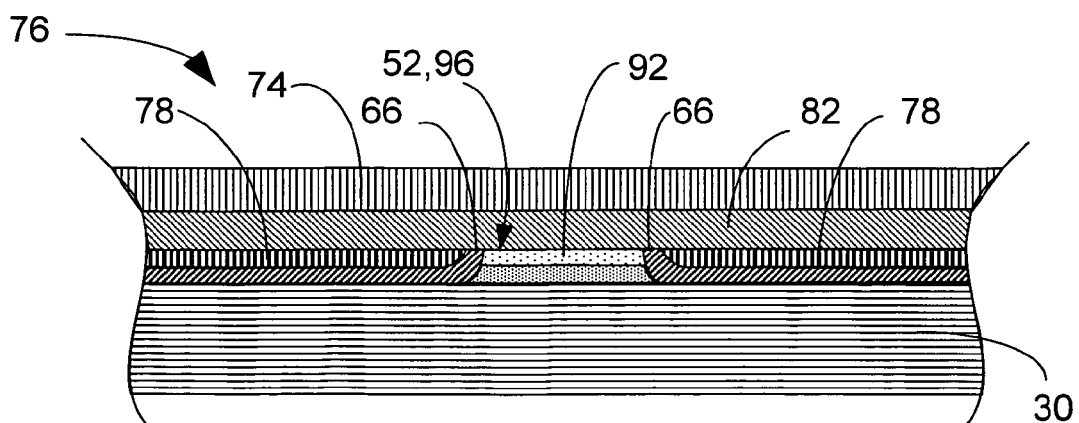

In FIG. 15, a second magnetic shield layer 74 is deposited to complete the hard bias stabilization variation 76.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

THIS CORRESPONDENCE CHART IS FOR EASE OF UNDERSTANDING AND INFORMATIONAL PURPOSES ONLY, AND DOES NOT FORM A PART OF THE FORMAL PATENT APPLICATION.

| | |
|---|---|
| 2 | magnetic disk drive |
| 4 | magnetic data storage disks |
| 6 | data tracks |
| 8 | data read/write device |
| 10 | actuator arm |
| 12 | suspension |
| 14 | magnetic heads |
| 16 | sliders |
| 18 | coil |
| 20 | P1 pole |
| 22 | second pole P2 |
| 23 | write gap |
| 24 | ABS |
| 26 | write head portion |
| 28 | read head portion |
| 30 | first shield S1 |
| 32 | insulation |
| 34 | second shield S2 |
| 40 | read sensor |
| 50 | high temperature photomask |
| 52 | sensor stack material |
| 54 | first DLC layer |
| 55 | protected areas |
| 56 | spin-on polymide layer |
| 57 | release layer |
| 58 | Si-based photoresist |
| 59 | secondary mask layer |
| 60 | photomask pattern |
| 61 | CMP stop layer |
| 62 | RIE |
| 63 | planarized structure |
| 64 | ion milling |
| 65 | another planarized structure |
| 66 | electrical isolation layer |
| 68 | magnetic shield material layer |
| 70 | second DLC layer |
| 72 | in-stack bias with draped shield variation |
| 74 | second magnetic shield |
| 76 | hard bias stabilization variation |
| 78 | hard bias layer |
| 80 | spacer film layer |
| 82 | spacer/top electrode layer |
| 90 | in-stack bias sensor |
| 92 | free magnetic layer |
| 94 | in-stack biasing layer |
| 96 | external bias sensor |

What is claimed is:

1. A method for fabricating a CPP read head for a magnetic disk drive having an electrical isolation layer, comprising:
   A) providing a first magnetic shield layer;
   B) depositing a sensor stack on said first magnetic shield layer;
   C) depositing a first CMP stop layer on said sensor stack;
   D) depositing a release layer on said first CMP stop layer;
   E) depositing photoresist material containing Si on said release layer;
   F) patterning said photoresist material to form protected areas in the underlying materials;
   G) oxidizing said photoresist material by use of Reactive Ion Etching to form a high temperature photomask;
   H) depositing said electrical isolation layer to surround said sensor stack using a high temperature deposition process, where said high temperature photomask protects said protected areas during said high temperature deposition process;
   I) depositing a draped magnetic shield material layer on said electrical isolation layer;
   J) depositing a second CMP stop layer on said draped magnetic shield material layer; and
   K) planarizing said isolation layer and said draped magnetic shield material layer to the level of said sensor stack to form a planarized structure.

2. The method of fabricating a CPP read head of claim 1, wherein:
   said sensor stack is an in-stack bias sensor.

3. The method for fabricating a CPP read head of claim 1, further comprising:
   L) depositing a second magnetic shield layer upon said planarized structure.

4. The method for fabricating a CPP read head of claim 1, wherein:
   said planarizing of K) is done by CMP processes and said first and second CMP stop layers act to limit the planarizing action.

5. The method for fabricating a CPP read head of claim 1, wherein:
   said first CMP stop layer is diamond-like-carbon.

6. The method for fabricating a CPP read head of claim 1, wherein:
   said release layer also acts as a secondary mask layer.

7. The method for fabricating a CPP read head of claim 1, wherein:
   said release layer is spin-on polymide.

8. The method for fabricating a CPP read head of claim 1, wherein:
   said high temperature deposition process of H) includes a process chosen from the group consisting of Chemical Vapor Deposition, Atomic Layer Deposition, Plasma Enhanced Chemical Vapor Deposition or High Temperature Sputtering.

9. The method for fabricating a CPP read head of claim 1, wherein:
   oxidizing of said photoresist material by use of Reactive Ion Etching of G) is done by using a gas chosen from the group consisting of oxygen and carbon dioxide.

* * * * *